US008954086B2

(12) United States Patent
Chun et al.

(10) Patent No.: US 8,954,086 B2
(45) Date of Patent: Feb. 10, 2015

(54) METHOD OF PERFORMING A MEASUREMENT PROCEDURE IN LTE-A (LONG-TERM EVOLUTION ADVANCED) SYSTEM

(75) Inventors: Sung-Duck Chun, Gyeonggi-Do (KR); Seung-June Yi, Gyeonggi-Do (KR); Sung-Hoon Jung, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 13/259,110

(22) PCT Filed: Apr. 23, 2010

(86) PCT No.: PCT/KR2010/002577
§ 371 (c)(1),
(2), (4) Date: Sep. 22, 2011

(87) PCT Pub. No.: WO2010/126257
PCT Pub. Date: Nov. 4, 2010

(65) Prior Publication Data
US 2012/0094651 A1   Apr. 19, 2012

Related U.S. Application Data

(60) Provisional application No. 61/173,181, filed on Apr. 27, 2009, provisional application No. 61/184,833, filed on Jun. 7, 2009, provisional application No. 61/185,574, filed on Jun. 9, 2009, provisional application No. 61/186,389, filed on Jun. 12, 2009.

(51) Int. Cl.
*H04W 72/00* (2009.01)
*H04W 36/00* (2009.01)

(52) U.S. Cl.
CPC ................................. *H04W 36/0027* (2013.01)
USPC ...................... 455/452.2; 455/434; 455/67.11; 455/71; 370/332; 370/252; 370/345

(58) Field of Classification Search
None
See application file for complete search history.

(56) References Cited

U.S. PATENT DOCUMENTS

| 2008/0018919 | A1 | 1/2008 | Ohkawa |
| 2008/0153506 | A1 | 6/2008 | Yin et al. |
| 2008/0186919 | A1 | 8/2008 | Huang et al. |
| 2010/0040037 | A1* | 2/2010 | Choi et al. ................. 370/345 |
| 2010/0190487 | A1* | 7/2010 | Wang et al. ................. 455/423 |
| 2011/0182201 | A1* | 7/2011 | Pajukoski et al. ......... 370/252 |

FOREIGN PATENT DOCUMENTS

| EP | 1838123 | 9/2007 |
| JP | WO 2008/149534 A1 * | 12/2008 |
| KR | 10-2009-0016431 | 2/2009 |

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTNAN); Overall description; Stage 2 (Release 8)," 3GPP TS 36.300 V8.8.0, Mar. 2009.
LTE, "Evolved Universal Terrestrial Radio Access (E-UTRA); Requirements for support of radio resource management (3GPP TS 36.133 version 8.2.0 Release 8)," ETSI TS 136 133 V8.2.0, Nov. 2008, 43 pages.
Korean Intellectual Property Office Application Serial No. 10-2011-7020235, Notice of Allowance dated Aug. 29, 2013, 5 pages.

* cited by examiner

*Primary Examiner* — Rafael Pérez-Gutiérrez
*Assistant Examiner* — Keith Fang
(74) *Attorney, Agent, or Firm* — Lee, Hong, Degerman, Kang & Waimey

(57) ABSTRACT

The invention disclosed herein relates to a wireless communication system and a user equipment (UE) providing wireless communication services, and more particularly, to a method of effectively performing the measurement of a plurality of frequencies while reducing the measurement load of the UE in the carrier aggregation technology for increasing data transmission speed using a plurality of frequencies in an Evolved Universal Mobile Telecommunications System (E-UMTS), a Long Term Evolution (LTE) system, and a LTE-Advanced (LTE-A) system that have evolved from a Universal Mobile Telecommunications System (UMTS).

4 Claims, 6 Drawing Sheets

METHOD OF PERFORMING A MEASUREMENT PROCEDURE IN LTE-A (LONG-TERM EVOLUTION ADVANCED) SYSTEM

CROSS-REFERENCE TO RELATED APPLICATIONS

This application is the National Stage filing under 35 U.S.C. 371 of International Application No. PCT/KR2010/002577, filed on Apr. 23, 2010, which claims the benefit of U.S. Provisional Application Ser. Nos. 61/173,181, filed on Apr. 27, 2009, 61/184,833, filed on Jun. 7, 2009, 61/185,574, filed on Jun. 9, 2009, and 61/186,389, filed on Jun. 12, 2009, the contents of all of which are hereby incorporated by reference herein in their entirety.

TECHNICAL FIELD

The present invention relates to a wireless communication system and a user equipment (UE) providing wireless communication services, and more particularly, to a method of effectively performing the measurement of a plurality of frequencies while reducing the measurement load of UE in the carrier aggregation technology for increasing data transmission speed using a plurality of frequencies in an Evolved Universal Mobile Telecommunications System (E-UMTS), a Long Term Evolution (LTE) system, and a LTE-Advanced (LTE-A) system that have evolved from a Universal Mobile Telecommunications System (UMTS).

BACKGROUND ART

First, the LTE system is a mobile communication system that has evolved from a UMTS system, and the standard has been established by 3rd Generation Partnership Project (3GPP), which is an international standardization organization.

FIG. 1 is a view illustrating the network architecture of an LTE system, which is a mobile communication system to which the related art and the present invention are applied.

As illustrated in FIG. 1, the LTE system architecture can be roughly classified into an Evolved UMTS Terrestrial Radio Access Network (E-UTRAN) and an Evolved Packet Core (EPC). The E-UTRAN may include a user equipment (UE) and an Evolved NodeB (eNB, base station), wherein the connection between UE-eNB is called a Uu interface, and the connection between eNB-eNB is called an X2 interface. The EPC may include a Mobility Management Entity (MME) performing a control-plane function and a Serving Gateway (S-GW) performing a user-plane function, wherein the connection between eNB-MME is called an S1-MME interface, and the connection between eNB-S-GW is called an S1-U interface, and both connections may be commonly called an S1 interface.

A radio interface protocol is defined in the Uu interface which is a radio section, wherein the radio interface protocol is horizontally comprised of a physical layer, a data link layer, a network layer, and vertically classified into a user plane (U-plane) for user data transmission and a control plane (C-plane) for signaling transfer. Such a radio interface protocol can be typically classified into L1 (first layer) including a PHY layer which is a physical layer, L2 (second layer) including MAC/RLC/PDCP layers, and L3 (third layer) including a RRC layer as illustrated in FIGS. 2 and 3. Those layers exist as a pair in the UE and E-UTRAN, thereby performing data transmission of the Uu interface.

FIGS. 2 and 3 are exemplary views illustrating the control plane and user plane architecture of a radio interface protocol between UE and E-UTRAN in an LTE system, which is a mobile communication system to which the related art and the present invention are applied.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjust a data size such that a lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB). In particular, AM RLC performs a re-transmission function through an automatic repeat and request (ARQ) function for reliable data transmission.

A Packet Data Convergence Protocol (PDCP) layer of the second layer performs a header compression function for reducing the size of an IP packet header which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

In the related art, only one frequency is used by UE. Accordingly, in the related art, if the UE has a single transmission/reception (Tx/Rx) circuit, then the UE has to temporarily stop data transmission and reception with a currently accessed cell to perform inter-frequency measurement or inter-RAT measurement, thereby causing the problem of decreasing the speed of data transmission.

As a result, according to the present invention, in the UE provided with a plurality of Tx/Rx circuits to perform a CA operation, there is provided a method that one Tx/Rx circuit performs inter-RAT or inter-frequency measurement while another Tx/Rx circuit transmit or receives data with a currently accessed base station, thereby reducing the discontinuation of data transmission.

DISCLOSURE OF INVENTION

Solution to Problem

Accordingly, an object of the present invention is to provide a method of effectively performing a measuring procedure in an operation of carrier aggregation (CA) of a LTE-A (LTE-Advanced) system.

In order to solve the foregoing problem, the present invention proposes a method of performing the measuring procedure in a wireless communication system, the method comprising: transferring data using a plurality of different frequencies; and receiving a measurement command from a network, wherein the measurement command includes at least one specific frequency that a terminal should perform a measurement by using a time interval, wherein the measurement command further includes frequency information indicating a termination of the data transfer for the time interval, and wherein the frequency information is related with at least one of the plurality of different frequencies; performing the measurement at the at least one specific frequency; and transmitting a measurement report based on the performed measurement.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

According to a basic concept of the present invention, there is proposed a method of performing a measuring procedure in a wireless communication and proposed a wireless mobile communication UE (or terminal) capable of performing such a method, which is characterized by including the steps of transferring data using a plurality of different frequencies; and receiving a measurement command from a network, wherein the measurement command includes at least one specific frequency that a terminal should perform a measurement by using a time interval, wherein the measurement command further includes frequency information indicating a termination of the data transfer for the time interval, and wherein the frequency information is related with at least one of the plurality of different frequencies; performing the measurement at the at least one specific frequency; and transmitting a measurement report based on the performed measurement.

Hereinafter, the configuration and operation of preferred embodiments according to the present invention will be described with reference to the accompanying drawings.

Figure 1:
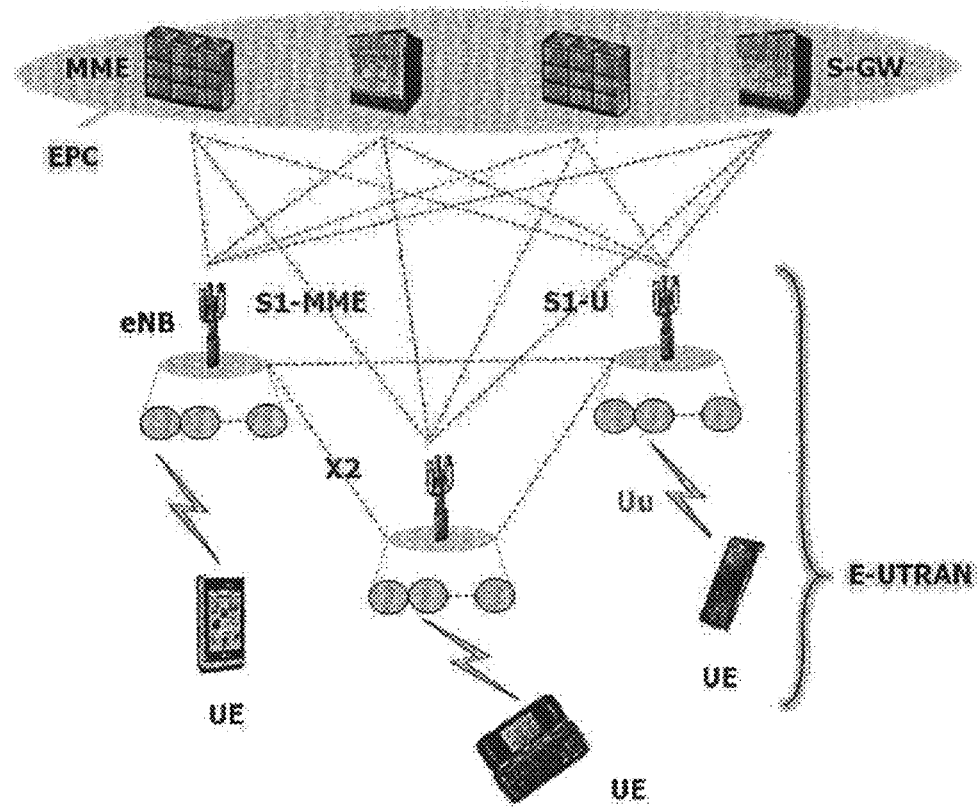
FIG. 1 is a view illustrating the network architecture of an LTE system, which is a mobile communication system to which the related art and the present invention are applied.
Figure 2:
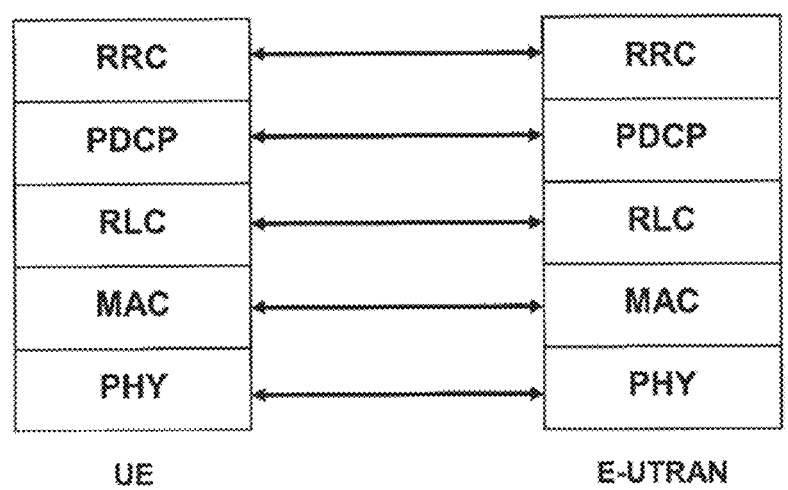
FIG. 2 is an exemplary view illustrating a control plane architecture in a radio interface protocol between UE and E-UTRAN in the related art.
Figure 3:
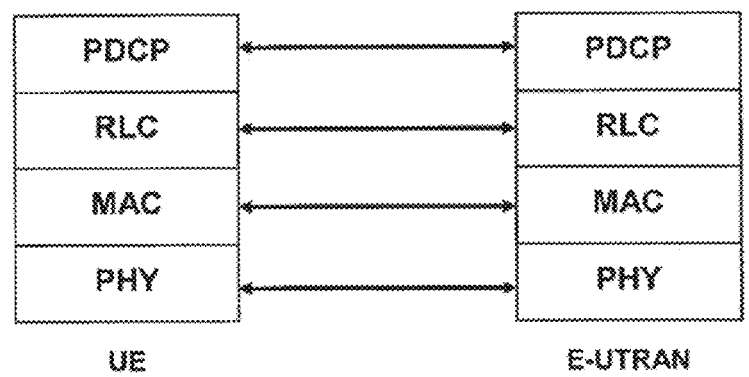
FIG. 3 is an exemplary view illustrating a user plane architecture in a radio interface protocol between UE and E-UTRAN in the related art.
Figure 4:
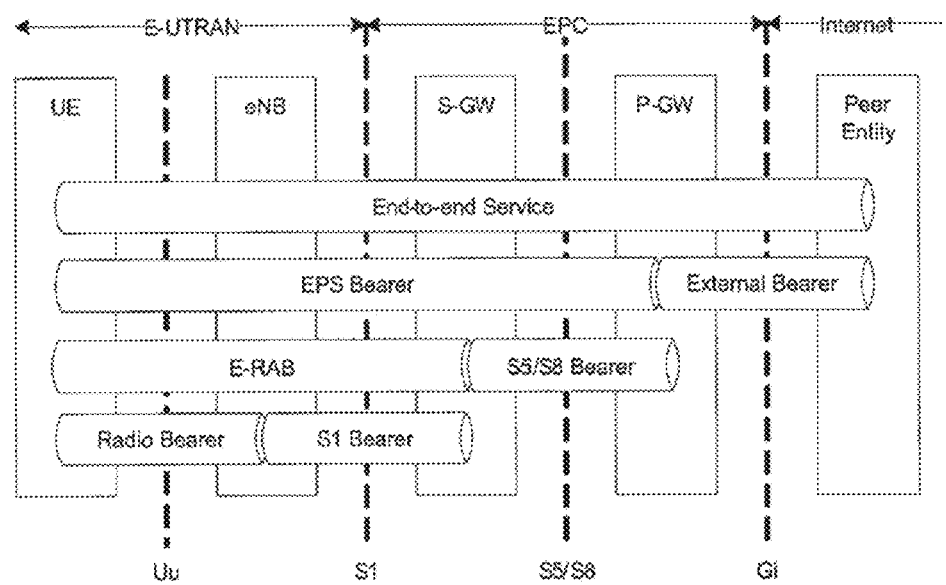
FIG. 4 is an exemplary view illustrating a bearer service architecture of the LTE system.

First, a bearer service architecture of the LTE system will be described. FIG. 4 is an exemplary view illustrating a bearer service architecture of the LTE system. Typically, Radio Bearer is a bearer provided in a Uu interface to support the user's service. In 3GPP, each bearer is defined for each interface as illustrated therein to guarantee independence between those interfaces. Specifically, bearers provided by LTE system are commonly called an Evolved Packet System (EPS) bearer, which can be divided into Radio Bearer, S1 Bearer, and the like, for each interface as illustrated in FIG. 4.

In FIG. 4, Packet Gateway (P-GW) is a network node for connecting between the LTE network and another network, and EPS Bearer provided by the LTE system is defined between UE and P-GW. The EPS Bearer is subdivided between individual nodes of the LTE system, and defined as Radio Bearer between UE-eNB, S1 Bearer between eNB-S-GW, and S5/S8 Bearer between S-GW and P-GW. Each bearer is defined through quality of service (QoS), and the QoS may include data rate, error rate, delay, and the like. Accordingly, QoS that should be totally provided by an LTE system is defined as a EPS bearer, and then each QoS is determined for each interface, and the bearer is set for each interface according to the QoS that should be provided by itself. Since the bearer of each interface is provided by dividing a total EPS bearer into sections, the EPS bearer and other bearers, such as Radio Bearer, S1 Bearer, and the like are all one-to-one relationships.

Hereinafter, a Long-Term Evolution Advanced (LTE-A) system will be described. The LTE-A system is a system that has been developed from an LTE system to meet IMT-Advanced conditions, which are the fourth generation mobile communication conditions recommended by the International Telecommunication Union-Radiocommunication Sector (ITU-R). At present, the LTE-A system standard is actively under development by 3GPP that has developed the LTE system standard. Representative technologies newly added in the LTE-A system mi carrier aggregation technology for extending a used bandwidth to be flexibly used, and relay technology for increasing coverage, supporting group mobility, and allowing network arrangement.

Figure 5:
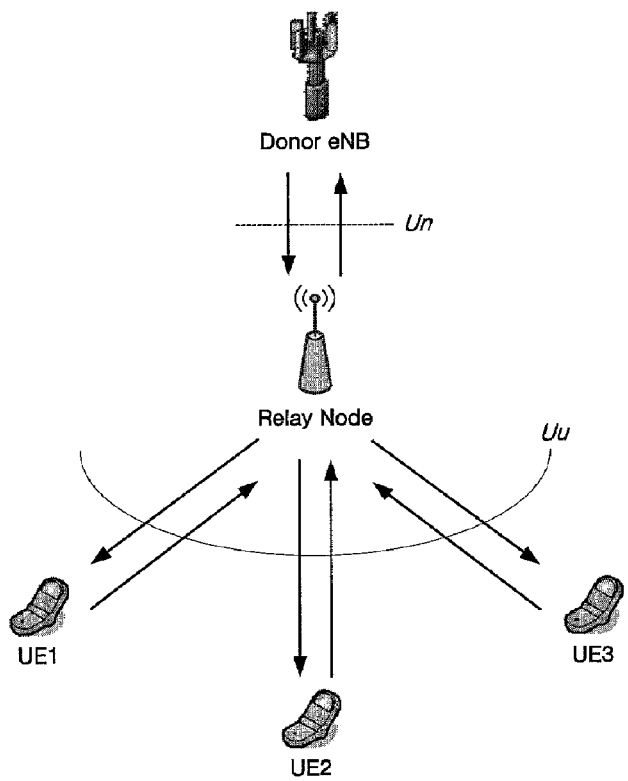
FIG. 5 is an exemplary view illustrating an relay node (RN) of the LTE-A (LTE-Advanced) system.

Here, relay is a technology for relaying data between a user equipment (EU) and an Evolved Node B (eNB, base station). Since communication is not smoothly implemented in case where a distance between UE and eNB is far in the LTE system, it is introduced in an LTE-A system as a method of making up for the problem. A new network node, which is referred to as Relay Node (RN), is introduced between UE and eNB to perform such a relay operation, wherein the eNB for managing RN is called Donor eNB (DeNB). In addition, an interface between RN-DeNB that has been newly added due to RN is defined as an Un interface, thereby being differentiated from a Un interface that is an interface between UE and a network node. FIG. 5 illustrates such a concept of Relay Node and an Un interface.

Here, the RN serves to manage UE in behalf of the DeNB. In other words, from a standpoint of the UE, the RN is shown as DeNB, and therefore, a MAC/RLC/PDCP/RRC, which is a Uu interface protocol that has been used in a conventional LTE system, are used as they are in a Uu interface between UE-RN.

From a standpoint of the DeNB, the RN may be shown as UE or shown also as eNB according to circumstances. In other words, when the RN is first accessed to the DeNB, it is accessed through random access like UE because the existence of the RN is unknown to the DeNB, but operated like eNB managing UE connected to itself after the RN is once accessed to the DeNB. Accordingly, along with the Uu interface protocol, the functions of the Un interface protocol should be also defined as in the form to which a network protocol function is also added. For the Un interface protocol, discussions as to which functions should be added or changed to each protocol layer on the basis of Uu protocols such as MAC/RLC/PDCP/RRC are still in progress in 3GPP.

Figure 6:
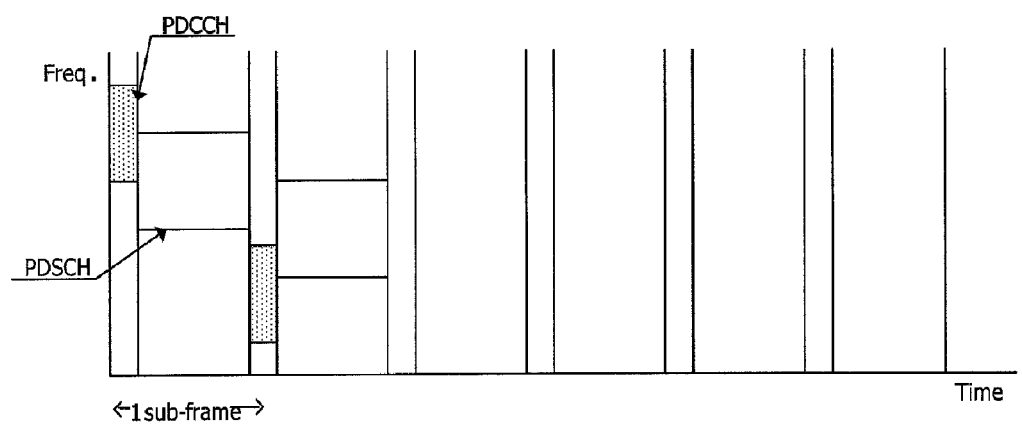
FIG. 6 is an exemplary view illustrating a method of receiving data in a downlink direction.

Next, there will be described a method in which the UE receives data in a downward direction in an LTE system. FIG. 6 is an exemplary view illustrating a method of receiving data in a downward direction.

As illustrated in FIG. 6, a physical channel in a downward direction can be roughly divided into two types, such as a Physical Downlink Control Channel (PDCCH) and a Physical Downlink Shared Channel (PDSCH). Here, control information, which is not directly related to the transmission of user data but required for operating a physical channel, is transmitted over the PDCCH. To explain most briefly, the PDCCH can be also used to control other physical channels.

In particular, the PDCCH is used to transmit information that is required to receive the PDSCH. Information as to at a specific timing, data to be transferred using a specific frequency bandwidth, for a certain UE, a certain size of data to be transferred, and the like will be transmitted over the PDCCH. Accordingly, each UE receives the PDCCH at a specific Time Transmission Interval (TTI), checks whether or not data that should be received by itself is transmitted, and additionally receives the PDSCH using information such as the frequency indicated by the PDCCH, and the like if notified that data that should be received by itself is transmitted. Information as to data of the PDSCH to be transmitted to a certain UE(s) (a single or a plurality of UEs), how to receive and decode PDSCH data by the UEs, and the like can be included in a Physical Downlink Control Channel (PDCCH) to be transmitted.

For example, in a specific subframe, it is assumed that radio resource information (for example, frequency position) called "A" and transport type information (for example, transport block size, modulation and coding information, etc.) called "B" are CRC-masked to an Radio Network Temporary Identity RNTI (RNT) called "C", and transmitted via the PDCCH. One or two or more UEs located in the relevant cell monitor the PDCCH using their RNTI information, and on the above assumption, when the UE having the RNTI called "C" decodes the PDCCH, a CRC error does not occur. Thus, the UE decodes the PDSCH to receive data by using the transport type information called "B" and the radio resource information called "A". On the contrary, on the above assumption, if the UE does not have the RNTI called "C" when the PDCCH is decoded, a CRC error occurs. Thus, the UE does not receive the PDSCH.

In the above procedure, the Radio Network Temporary Identifier (RNTI) is transmitted to inform to which UEs radio resources have been allocated. The RNTI includes a dedicated RNTI and a common RNTI. The dedicated RNTI is allocated to a single UE and used to transmit or receive data corresponding to the UE. The dedicated RNTI is allocated only to the UE whose information has been registered in the base station. On the contrary, the common RNTI is used when UEs, which have not been allocated the dedicated RNTI because their information was not registered to the base station, transmit or receive data to or from the base station, or the common RNTI is used to transmit information commonly applied for a plurality of UEs.

Hereinafter, a RRC_IDLE state of the UE will be described in detail. The UE in the RRC_IDLE state should always select the cell having a suitable quality to be prepared to receive services through this cell. For example, the UE that has just powered on should select the cell having a suitable quality to be registered in a network. If the UE that has been in a RRC_CONNECTED state enters into RRC_IDLE, then the UE should select a cell to stay in RRC_IDLE. As described above, a process in which the UE selects the cell satisfying certain conditions to stay in a service waiting state such as the RRC-IDLE state is called cell selection.

Hereinafter, a method of selecting a cell by the UE will be described. When power is initially turned on, the UE searches available PLMNs and then selects a suitable PLMN capable of receiving services. Subsequently, the UE selects a cell having signal qualities and characteristics capable of receiving a suitable service among the cells provided by the selected PLMN. Here, the cell selection process is roughly divided into two types. First, for an initial cell selection process, the UE have no previous information about radio channels. Thus, the UE searches all radio channels to find a suitable cell. In each channel, the UE finds the strongest cell. Then, once the UE finds a suitable cell satisfying the cell selection criteria, the UE selects the relevant cell. Next, in a cell selection process using the stored information, a cell is selected by using information stored in the UE for radio channels or using information broadcast from the cells during the process. Thus, a cell selection can be promptly performed compared to an initial cell selection process. Once the UE finds a suitable cell satisfying the cell selection criteria, the UE selects the relevant cell. If a suitable cell satisfying the cell selection criteria is not found through this process, then the UE performs an initial cell selection process.

Hereinafter, a process of reselecting a cell will be described. After a certain cell is once selected through a cell selection process, a signal intensity or quality between the UE and the base station may vary due to mobility of the UE, change of radio environments, or the like. Thus, if the quality of the selected cell is deteriorated, then the UE can select another cell providing a better quality. In case of reselecting a cell in this manner, the cell providing a better signal quality than the currently selected cell is typically selected. This process is called cell selection. The cell reselection process, from a viewpoint of the quality of a radio signal, has a basic purpose to typically select a cell providing the best quality to the UE. In addition to the viewpoint of the quality of a radio signal, a network can determine a priority for each frequency to inform the priority to the UE. The UE that has received such a priority preferentially considers this priority during the cell reselection process compared to the radio signal quality criteria.

Hereinafter, carrier aggregation (hereinafter, referred to as "CA") of an LTE-A system will be described.

Figure 7:
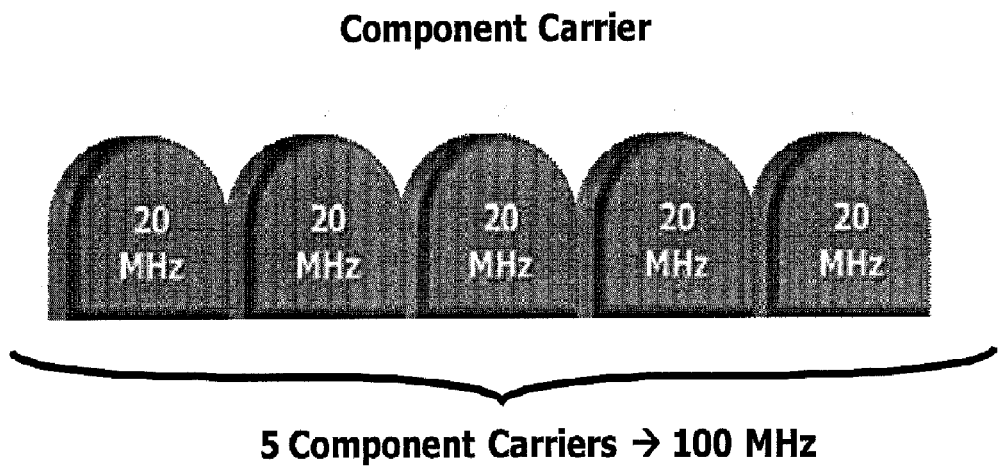
FIG. 7 is an exemplary view illustrating a carrier aggregation technology in the LTE-A system.

The LTE-A technical standard as an IMT-Advanced candidate technology of the International Telecommunication Union (ITU) is designed to meet the IMT-Advanced technical requirements. Accordingly, discussions for extending a bandwidth compared to the existing LTE system are in progress to satisfy the requirements of ITU. To extend a bandwidth in the LTE-A system, the carrier that can be possessed by the existing LTE system is defined as a component carrier (hereinafter, referred to as "CC"), and discussions are under way to use them by bundling up to five CCs. Since each CC may have a bandwidth up to 20 MHz, it is a concept that can be extended up to 100 MHz. The technology of bundling up a plurality of CCs to use them is called CA. FIG. 7 is an exemplary view illustrating the carrier aggregation technology in such an LTE-A system.

Figure 8:
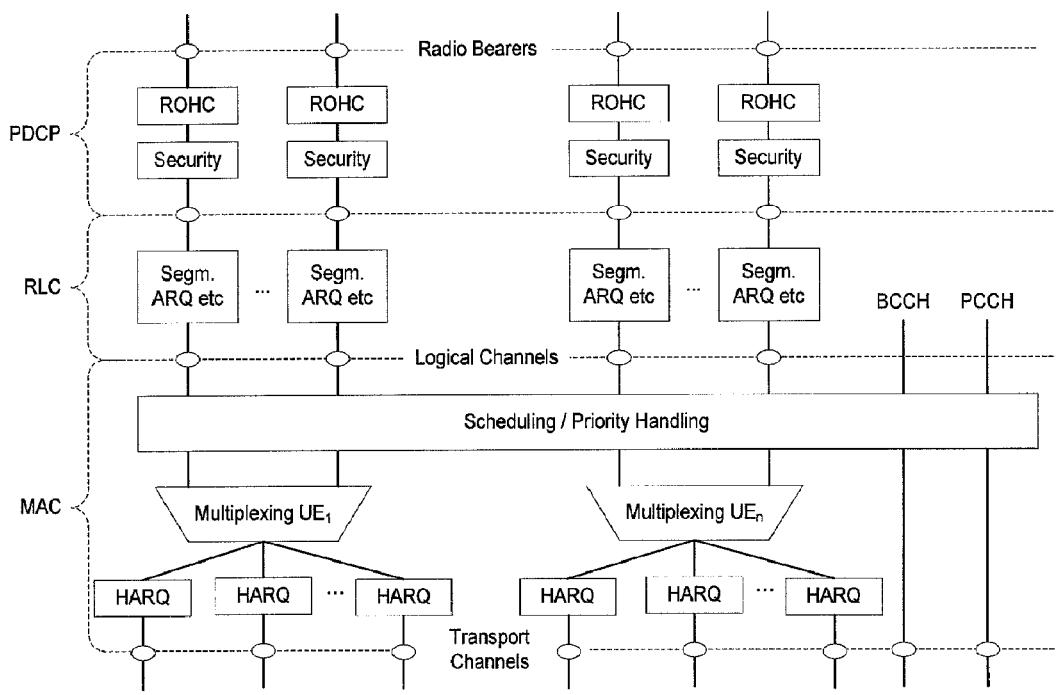
FIGS. 8 and 9 are exemplary views illustrating a downlink and an uplink protocol structure in consideration of the carrier aggregation technology.
Figure 9:
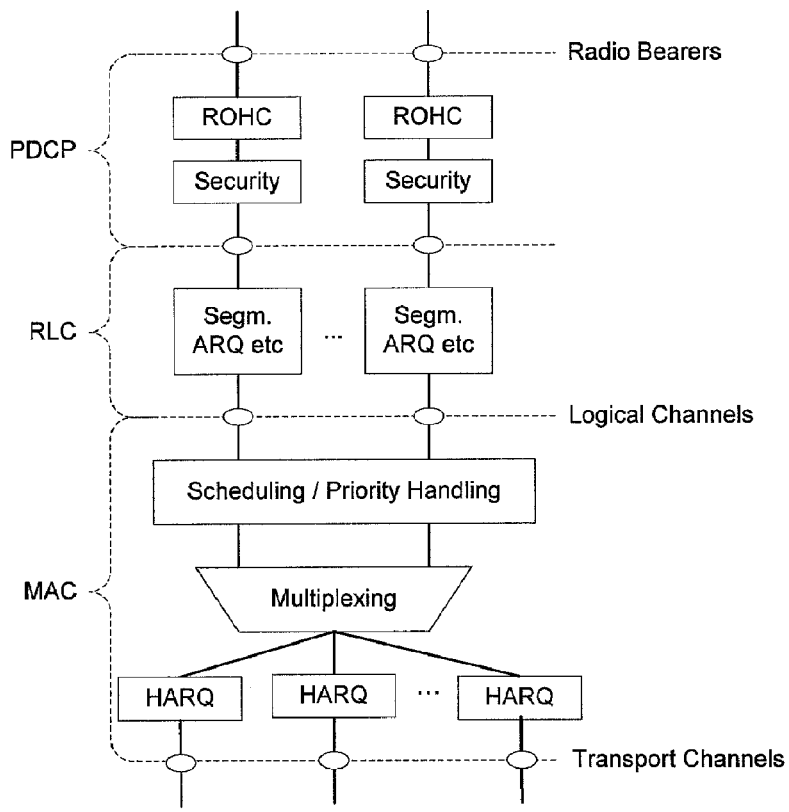

FIGS. 8 and 9 are exemplary views illustrating a downlink and an uplink protocol structure in consideration of the carrier aggregation technology. Typically, the CA technology to which the present invention is applied can greatly affects the MAC layer in Layer 2. For example, a plurality of CCs are used in CA, but a HARQ entity manages a single CC, and thus the operations related to a plurality of HARQ entities should be performed in the MAC layer of the LTE-A system. In addition, each of the HARQ entities independently processes a transport block, and thus a plurality of transport blocks can be transmitted or received at the same time through a plurality of CCs.

Next, measurement will be described. In a mobile communication system, it is essentially required to support the mobility of the UE. To support the mobility, the UE continues to measure the quality of a serving cell currently providing a service, and the quality for a neighboring cell adjacent to the serving cell. The UE transmits the measured result to a network at a suitable time, and the network provides the optimum mobility to the UE through a handover command, and the like, based on the measurement result value reported by the UE.

In addition to the purpose of mobility support, a mobile communication terminal performs a special purposed measurement procedure that has been set by a network to provide information capable of helping the service provider to administer a network, and then reports the measurement result to the network. For example, the UE receives broadcast information of a specific cell determined by a network to acquire identifier information of this cell (for example, global cell identity) or location identification information to which the relevant cell belongs (for example, tracking area code) and other cell information (for example, member or non-member in case of a closed subscriber group (CSG)), and then reports those information to the serving cell. Alternatively, in case where the UE confirms that the quality of a specific area is very bad during the movement, the UE may report the location information and measurement results for the cells having bad qualities to the network. A network may seek the optimization of the network based on the measurement result reports from the UEs for helping the management of the network.

In the form of managing a mobile communication system having a frequency reuse factor of 1, mobility is mostly implemented between different cells having the same frequency. Accordingly, in order to guarantee the mobility of the UE, the UE should be able to easily find cells having the same center frequency as the serving cell, and should be able to easily measure the quality and cell information of the found neighboring cells. The measurement for a cell using the same center frequency as the center frequency of the serving cell is called intra-frequency measurement. The UE performs intra-frequency measurement to report the measurement result at a suitable time, thereby accomplishing an object of the relevant measurement result.

The mobile communication service provider may manage a network using several frequencies. In case where a service of the mobile communication system is provided through several frequencies in this manner, in order to guarantee the optimized mobility to the UE, the UE should be also able to find cells having a different frequency from the serving cell, and should be able to easily measure the quality and cell information of the found neighboring cells. The measurement for a cell using a different center frequency from the center frequency of the serving cell is called inter-frequency measurement. The UE should be able to perform inter-frequency measurement to report the measurement result at a suitable time.

If the UE supports the measurement for a mobile communication network, then the measurement of the mobile communication network can be implemented by the setting of the base station. At present, from a viewpoint of the LTE terminal, inter-RAT may include UTRA and GERAN according to the 3GPP standard specification, and may also include a CDMA 2000 system according to the 3GPP2 standard specification.

Figure 10:
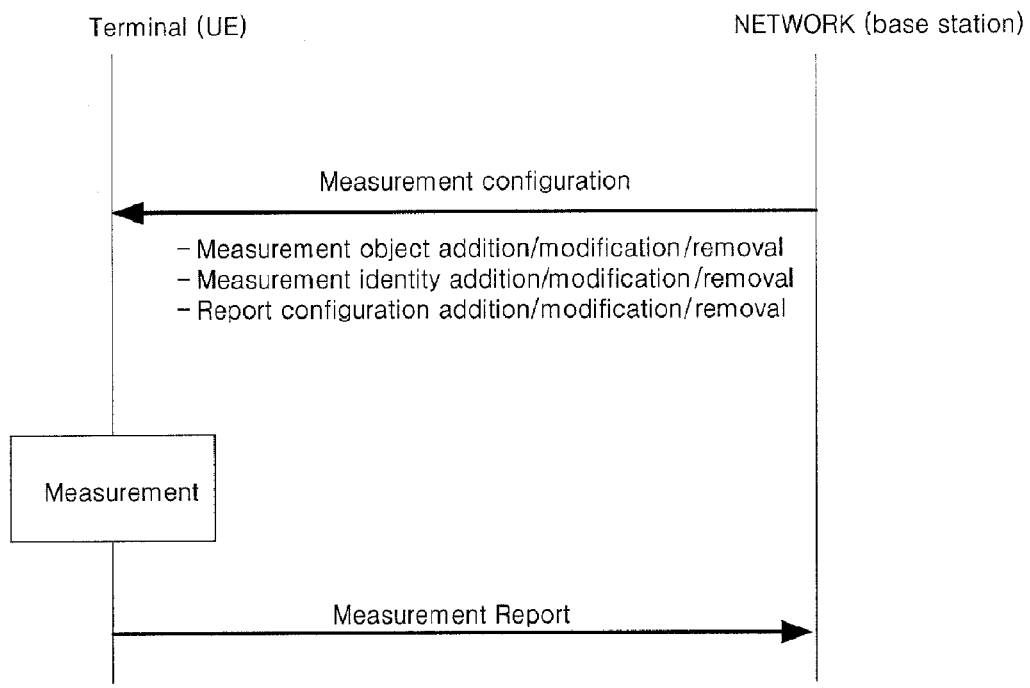
FIG. 10 is an exemplary view illustrating a measurement configuration and measurement report procedure to which the present invention is applied.

FIG. 10 is an exemplary view illustrating a measurement configuration and measurement report procedure to which the present invention is applied.

As illustrated in FIG. 10, the UE determines a measurement object according to the measurement configuration (hereinafter, measurement setting) that has been set by the base station, and reports the measurement result. In other words, if the UE receives a Measurement Configuration message or a message corresponding to the message, then the UE performs measurement according to this. As a result of the measurement, if measurement result report conditions included in the measurement configuration are satisfied, then the measurement result is transmitted through a Measurement Report (MR) or a message corresponding to the message.

Here, the measurement configuration may include the following parameters.

Measurement objects: A parameter for determining an object to be measured by the UE. A measurement object to be set from a standpoint of the UE is one of an intra-frequency measurement object, an inter-frequency measurement object, and an inter-RAT measurement object.

Reporting configurations: A parameter for determining the reference and report type as to when the UE should perform the transmission of a measurement result report message (i.e., report trigger).

Measurement identities: An identification parameter for determining when the UE reports to which object with which method by connecting a specific measurement object with a specific reporting configuration. The measurement identity is also included in a measurement result transmission message, indicating for which object the measurement result included in the relevant message is provided, and by which cause (report trigger) the transmission of the measurement result message has been generated.

Quantity configurations: A parameter for setting the measurement unit/report unit and setting a filter value to filter the measurement result values.

Measurement gaps: A time to be used by the UE to only measure without worrying about data transmission with the serving cell caused by not scheduling downlink or uplink transmission.

The UE has a measurement object list, a measurement reporting configuration list, and a measurement identity list for the measurement procedure. Typically, an E-UTRAN base station can set only one measurement object with respect to a single frequency for the UE.

Figure 11:
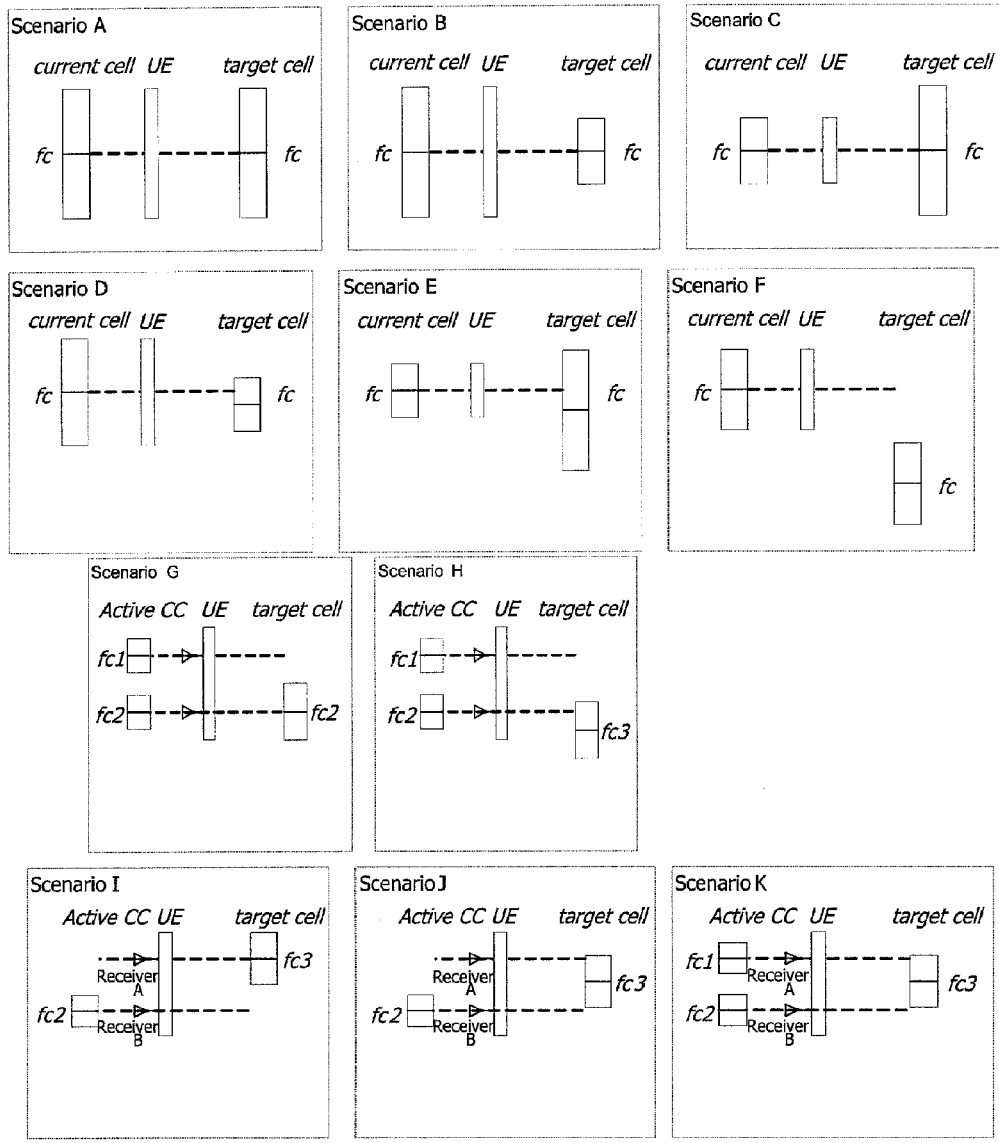
FIG. 11 is an exemplary view illustrating inter and intra-frequency measurements scenarios according to the present invention.

FIG. 11 illustrates exemplary inter and intra-frequency measurements scenarios. In FIG. 11, scenarios A, B and C belong to an intra-frequency measurement and scenario D, E and F belong to an inter-frequency measurement. Basically, the intra-frequency measurement is the case where a serving cell and a target cell have same center frequency and the inter-frequency measurement is the case where a serving cell and a target cell have same center frequency.

In scenario G of FIG. 11, the center frequency of the target cell is same as the one of center frequencies to which receivers of the UE are tuned. Thus, there is no need for a terminal (UE) to re-tune its receiver. In scenario H of FIG. 11, the center frequency of the target cell is not same as any one of center frequencies to which receivers of the terminal (UE) are tuned. Thus, one of the receivers of the terminal (UE) should be re-tuned to receive the target cell. While there is no need for measurement gap for the scenario G, there is a need for measurement gap for the scenario H because fc3 is different from either fc1 or fc2.

There are many kinds of cells that should be measured by the UE. For example, the UE should also measure the cells existing in the frequency currently used by the UE itself to communicate with the base station. This is called intra-frequency measurement. For example, the UE should also measure the cells using a different frequency from the frequency currently used by the UE itself to communicate with the base station. This is called inter-frequency measurement. For example, the UE should also measure the cells using a different type of communication standard from the type currently used by the UE itself to communicate with the base station. This is called inter-RAT measurement.

In a conventional system, the UE uses only a single frequency and a single RAT at the same time. Therefore, if the UE has a single Tx/Rx circuit in the conventional technology, the UE has to temporarily stop data transmission and reception with a currently accessed cell. The time section in which data transmission and reception is temporarily suspended should be same for the UE and network. Otherwise, the base station may transmit data to the UE at the original frequency while the UE performs measurement at a different frequency. In this case, the UE cannot receive the data, causing the consumption of radio resources. As described above, a time section in which transmission and reception is temporarily suspended at the originally used frequency for the base station and the UE to measure a cell in a different frequency bandwidth or a different system is called measurement gap.

However, with the introduction of the CA method, the UE can be naturally provided with a plurality of Tx/Rx circuits. If all Tx/Rx circuits stop transmission and move to be transferred to the frequency that should be measured, then it may cause a problem of reducing the speed of data transmission.

According to the present invention, for the UE provided with a plurality of Tx/Rx circuits to perform a CA operation, there is provided a method that one Tx/Rx circuit performs inter-RAT or inter-frequency measurement while another Tx/Rx circuit transmit or receives data with a currently accessed base station, thereby reducing the discontinuation of data transmission.

According to the present invention, therefore, the base station informs the UE whether to perform intra-frequency or inter-RAT measurement at a certain frequency bandwidth. In other words, the base station informs the UE that measurement gap is to be set at which frequency bandwidth, among the frequency bandwidths currently set for data transmission and reception by the base station and UE. Thus, if the setting information of the measurement gap is received from the base station, then the UE may stop data transmission and reception for a period of time indicated by the measurement gap only in the frequency bandwidth indicated by the setting information of the measurement gap, and perform transmission and reception with the base station even during the time section indicated by the measurement gap in the frequency bandwidth not indicated by the setting information.

For example, it is assumed that the UE communicates with the base station through Freq 1 and Freq 2. At this time, the base station may desire that the UE performs the measurement of a Freq 3 or GSM cell. At this time, the base station may command that the UE performs the measurement of the Freq 3 or GSM cell for every 10 seconds, or instruct that the UE uses the measurement gap at Freq 2. At this time, the UE may stop data transmission and reception at Freq 2 for every 10 seconds, and measures the Freq 3 and GSM cell while at the same time implementing data transmission and reception with the base station.

Alternatively, during the above process, the base station may notify the information of Tx/Rx circuits for which measurement gap should be used. For example, Tx/Rx circuit #1 may be allocated to Freq 1, and Tx/Rx circuit #2 may be allocated to Freq 2. At this time, the base station may command that measurement gap should be only applied to the Tx/Rx circuit #2, and accordingly, the UE may changes to another frequency at this time if the Tx/Rx circuit #2 is only required to perform measurement.

In addition, the base station may command the UE that a certain frequency should be able to be always transmitted or received. For example, it is assumed that the UE communicates with the base station through Freq 1 and Freq 2. In this case, the base station may command that Freq 1 should be able to be always transmitted or received. In this case, if measurement gap is set, then the UE may temporarily stop transmission and reception at other frequencies except Freq 1, herein at Freq 2, and perform measurement.

Alternatively, the base station may allocate measurement gap to the UE, and deliver an inter-frequency/inter-RAT measurement command to the UE. At this time, the UE determines that measurement gap is set at which frequency among the set frequencies by considering its own Tx/Rx circuit information or the quality information of a currently used frequency, and may inform the base station of that fact. Then, the UE performs a measurement gap operation at the frequency. Activation or deactivation of each additional component is controlled by eNB during the CA operation. According to circumstances, any frequency cannot be allocated to some of several Tx/Rx circuits included in the UE. Scenarios I/J of the following drawing illustrate such a circumstance. In the scenarios I and J, the UE uses fc2. In this case, in order to measure fc3, the UE may measure fc3 using a supplementary Tx/Rx circuit. In other words, the supplementary Tx/Rx circuits are not used for data transmission and reception with a currently accessed cell, and therefore, the UE can measure fc3 at any time without measurement gap.

However, if all Tx/Rx circuits possessed by the UE are used for data transmission and reception with a currently accessed cell, for example, in case of the following scenario K, then the UE cannot measure fc3 without measurement gap.

Accordingly, according to the present invention, if a frequency of the neighboring cell to be measured corresponds to one of the frequencies currently accessed to be used by the UE, or there exists a Tx/Rx circuit that is not allocated to any frequency of the Tx/Rx circuits possessed by the UE, then it is proposed not to use measurement gap. Accordingly, if a frequency of the neighboring cell to be measured does not correspond to one of the frequencies currently accessed to be used by the UE, or there exists no Tx/Rx circuit that is not allocated to any frequency of the Tx/Rx circuits possessed by the UE, then it is proposed to use measurement gap.

If one Tx/Rx circuit possessed by the UE is used in the scenario K, then it may be possible to measure fc3. In this case, if all Tx/Rx circuits allocated to fc1 and fc2 are used the measurement of fc3, then it may only cause the discontinuation of data transmission and reception. As a result, in case where the UE that has been set to CA performs inter-frequency measurement or inter-RAT measurement, then the UE uses one of the set Tx/Rx circuits to perform the measurement.

Figure 12:
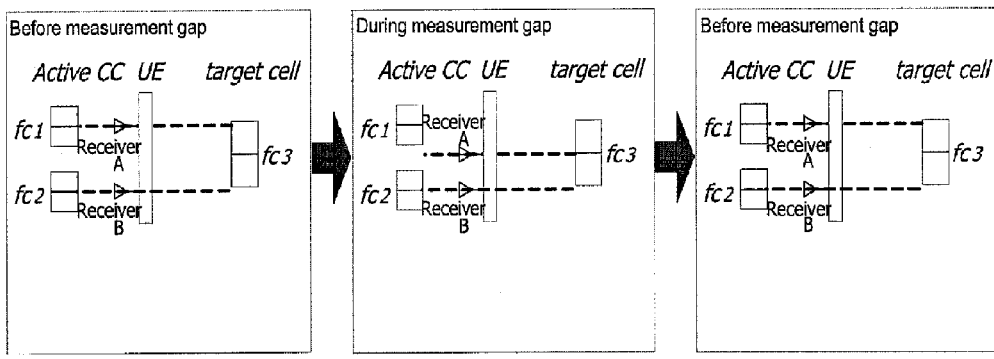
FIG. 12 is an exemplary view illustrating the operation of measuring a plurality of radio frequencies according to the present invention.

FIG. 12 is an exemplary view illustrating the operation of measuring a plurality of radio frequencies according to the present invention in this manner.

However, a suitable operation may be possible in case where a network has information as to which Tx/Rx circuit is to be allocated to which frequency. For example, if 800-900 MHz is available for the Tx/Rx circuit 1, and 1.8-1.9 GHz is available for the Tx/Rx circuit 2, then the UE cannot measure the frequency with accuracy if the measurement of 1.88 GHz is requested to the Tx/Rx circuit 1.

Accordingly, according to the present invention, it is proposed that the UE transfers CA measurement capability information (Carrier Aggregation Capability) to the network for a CA operation. Preferably, the CA measurement capability information is information for informing which frequency bandwidth can be measured by the UE. Preferably, the CA measurement capability information is information for informing the number of receivers possessed by the UE. Preferably, the CA measurement capability information is information for informing the number of Tx/Rx circuits possessed by the UE. Preferably, the CA measurement capability information is information for informing the number of Tx/Rx circuits that can be received by the UE at the same time. Preferably, the CA measurement capability information is information for informing the number of frequency bandwidths that can be measured by the UE at the same time. Preferably, the CA measurement capability information is information for informing the number of Tx/Rx circuits that can be received and measured by the UE at the same time. Preferably, the CA measurement capability information is information for informing the frequency bandwidth information supported by each Tx/Rx circuit. Preferably, frequency bandwidth may denote frequency in the foregoing description.

On the basis of this, a network informs to the UE to which frequency each Tx/Rx circuit of the UE is allocated in configuring the CA operation. In other words, if the network instructs the UE to use the Tx/Rx circuit 1 for the measurement of frequency 1, then the UE operates according to the instruction.

On the basis of this, a network informs to which frequency bandwidth a plurality of measurement gap patterns and each measurement gap pattern are applied or to which Tx/Rx circuit the each measurement gap pattern is applied. Accordingly, the Tx/Rx circuit 1 is set to measurement gap pattern 1 or set such that the measurement of frequency a is instructed or data is transmitted or received at frequency 1, and the Tx/Rx circuit 2 is set to measurement gap pattern 2 or set such that the measurement of frequency b is instructed or data is transmitted or received at frequency.

As a result, the measurement gap for inter-frequency measurement or inter-RAT measurement is set in case of the followings.

In case where the frequency that should be measured is different from any frequency set for the UE to currently communicate with the base station, and any one of the Tx/Rx circuits which are not used to communicate with the base station, among the Tx/Rx circuits possessed by the UE, does not support the frequency that should be measured.

Therefore, the measurement gap for inter-frequency measurement or inter-RAT measurement is not set in case of the followings.

In case where any frequency set for the UE to currently communicate with the base station corresponds to the frequency that should be measured, or there is any Tx/Rx circuit supporting the frequency that should be measured, among the Tx/Rx circuits which are not set to communicate with the base station.

A measurement report should be sent at a suitable time to move the UE to a new cell. For this purpose, according to the present invention, it is proposed that the UE sends a measurement report to the base station in the following cases.

For the neighboring cells adjacent to the cells to which the UE is currently accessed, if the number of cells having a better quality than that of the cells to which the UE is currently accessed among the neighboring cells is greater than a predetermined setting value, then the UE transmits a measurement report to the base station.

The present disclosure may provide a method of performing a measuring procedure in a wireless communication system, the method comprising: transferring data using a plurality of different frequencies; and receiving a measurement command from a network, wherein the measurement command includes at least one specific frequency that a terminal should perform a measurement by using a time interval, wherein the measurement command further includes frequency information indicating a termination of the data transfer for the time interval, and wherein the frequency information is related with at least one of the plurality of different frequencies; performing the measurement at the at least one specific frequency; and transmitting a measurement report based on the performed measurement, wherein the time interval is a measurement gap, the data is transferred to the network while the measurement is performed by a terminal, the frequency information indicating the termination of the data transfer for the time interval is assigned by the network, the all of the steps are performed in a LTE-A (Long Term Evolution System-Advanced) system, the measurement is at least one of an intra-frequency measurement, inter-frequency measurement, and inter-RAT measurement.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of performing a measuring procedure in a wireless communication system, the method comprising:
transmitting Carrier Aggregation (CA) measurement capability information to a network;
transferring data using a plurality of different frequencies; and
receiving a measurement command from the network,
wherein the measurement command includes at least one specific frequency to be measured during a time interval,
wherein the measurement command further includes frequency information indicating a termination of the transferring of data during the time interval, and
wherein the frequency information is related with at least one of the plurality of different frequencies;
performing measurement of the at least one specific frequency during the time interval; and
transmitting a measurement report based on the performed measurement,
wherein, if a specific frequency set for a terminal matches with a frequency that should be measured and if there are any transmitter or receiver circuits, which are not currently used to communicate with the network, that support the frequency that should be measured, data is transferred to the network using frequencies of the plurality of different frequencies other than the at least one specific frequency while the measurement of the at least one specific frequency is performed,
wherein the CA measurement capability information is for determining whether the specific frequency set for the terminal matches with the frequency that should be measured and for determining whether there are any transmitter or receiver circuits that support the frequency that should be measured, and
wherein transmitting the CA measurement capability information, transferring the data, receiving the measurement command, performing the measurement of the at least one specific frequency and transmitting the measurement report are performed in a LTE-A (Long-Term Evolution Advanced) system that supports a CA scheme.

2. The method of claim 1, wherein the time interval is a measurement gap.

3. The method of claim 1, wherein the frequency information indicating the termination of the transferring of data during the time interval is assigned by the network.

4. The method of claim 1, wherein the measurement is at least an intra-frequency measurement, an inter-frequency measurement or an inter-RAT measurement.

* * * * *